Jan. 4, 1949.   G. L. BORELL   2,458,331
FLOWMETER
Filed April 25, 1945

INVENTOR
GEORGE L. BORELL

BY  *George H. Fisher*
ATTORNEY

Patented Jan. 4, 1949

2,458,331

UNITED STATES PATENT OFFICE 2,458,331

FLOWMETER

George L. Borell, Minneapolis, Minn., assignor to Minneapolis-Honeywell Regulator Company, Minneapolis, Minn., a corporation of Delaware Application April 25, 1945, Serial No. 590,227

4 Claims. (Cl. 73—204)

My invention relates generally to flowmeters, and more particularly to such meters wherein a stream of fluid impinges upon a variable impedance member to change the impedance thereof, and to means for compensating such meters.

In the measurement of the flow of fluid, one method which has often been used with considerable success is to direct the fluid, whose flow is to be measured, across a heated resistor and to measure the change in resistance of this resistor produced by the cooling effect of the fluid. This method has been quite widely used, and if the conditions of the fluid remain constant, such a meter will measure the velocity of the fluid. It has previously been suggested to use such a meter in conjunction with a reservoir to measure the rate of climb or descent of an airplane, but such meters have not found much use since they have not been considered sufficiently accurate. I have found that the principal causes of error in such instruments are due to the change in density of the air at different altitudes, and the variation of pressure differential for a given differential of altitude at different altitudes. Methods are known by which such meters may be calibrated for differences in temperature, but differences in pressure and density present a problem which heretofore has not been solved in a practical manner which would make hot wire instruments suitable for use in aircraft.

It is therefore a major object of my invention to provide a flowmeter which may be compensated for changes in the density of the fluid whose flow is being measured.

It is another object of my invention to provide a compensating means for flowmeters by which the response of the meter may be varied in accordance with a condition.

It is an additional object of my invention to provide a compensating means which may be applied to existing flowmeters with little or no change save that of recalibration.

It is a further object of my invention to provide a flowmeter peculiarly adapted for use with my compensating means and especially suited for aircraft installation.

It is also an object of my invention to provide a compensating means which may produce a linear or nonlinear compensating effect depending upon the particular type of compensation needed.

It is a still further object of my invention to provide a compensating means which may be adapted to be controlled by any desired condition for which compensation must be made.

Figure 1:
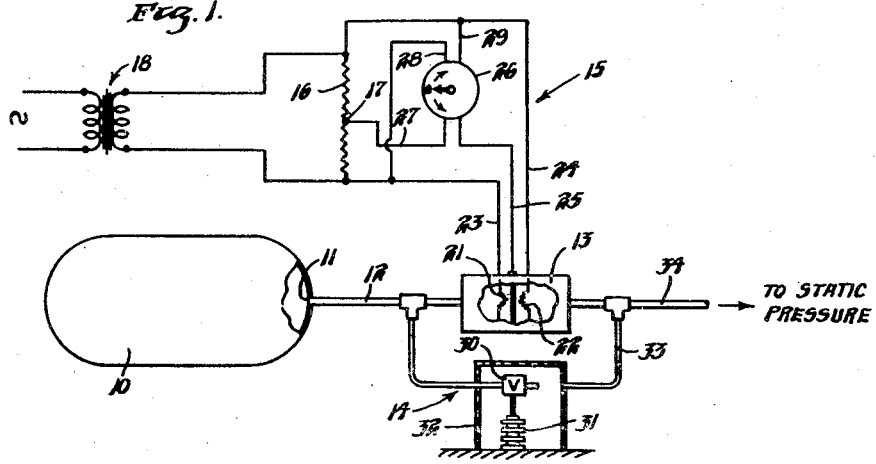
Figure 3:
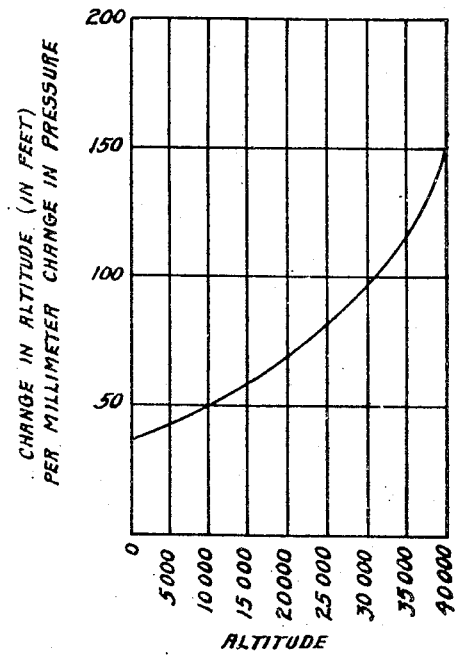
Figure 2:
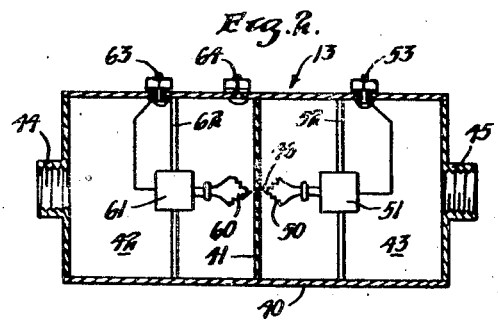

These and other objects of my invention will become apparent from the following description of preferred and modified forms thereof and from the drawings illustrating those forms in which Figure 1 is a schematic representation of a meter and compensation device built in accordance with my preferred design, Figure 2 is a cross-sectional view of my improved sensing device which I prefer to use with my compensating means, and Figure 3 is a graph illustrating how the varying density of the air requires a greater change in altitude to produce a given change of pressure at a greater altitude.

Referring now to the drawings and particularly to Figure 1 thereof, the numeral 10 indicates a reservoir of any suitable shape, sealed to prevent the admission or release of air therefrom except through a single opening 11 therein. A tube 12 leads from the opening 11 to a flow meter 13, and from there connection is made to a source of static pressure (not shown) so that the interior of the reservoir is maintained at a pressure very nearly equal to the static pressure. As applied to aircraft, the term "static pressure" means the pressure of the atmosphere at the particular altitude at which the plane is flying, as opposed to the "dynamic pressure" which is a combination of the atmospheric pressure and the pressure due to the forward movement of the plane through the atmosphere. The customary way of securing this static pressure is by the use of the Pitot-static tube or head, and since such devices are well known in the art, they will not be further described here.

Between the reservoir 10 and the source of static pressure, the tube 12 is connected to the flowmeter 13 which is provided with a by-pass 14 so that air in flowing from the reservoir 10 to the source of static pressure may pass either through the flowmeter 13 or through the by-pass 14. A tube 34 completes the connection from the reservoir 10 to the source of static pressure. The flow meter 13 is of the balanced bridge, hot wire type and is electrically connected in a circuit 15, hereinafter described, so that any flow of air through the flowmeter will unbalance the bridge and give an indication of the direction and amount of flow of air.

As shown in Figure 1, the circuit 15 may consist of a very simple bridge circuit with a resistor 16, having a center tap 17, connected to any suitable source of power, such as the plane's batteries, or a transformer 18 which is energized by the plane's inverter (not shown). Within the flowmeter 13 are a pair of resistors 21 and 22 which are substantially identical, electrically; and one end of resistor 21 is connected to one end of resistor 22 so that in effect a center-tapped resistor is obtained. The other end of resistor 21 is connected by conductor 23 to one end of resistor 16, and the corresponding end of resistor 22 is connected by conductor 24 to the opposite end of resistor 16. The common point of connection of resistors 21 and 22, which may be the housing of flowmeter 13, is connected by conductor 25 to one of the terminals of a phase-responsive meter 26, another terminal of which is connected by a conductor 27 to center tap 17 of resistor 16. This circuit will be recognized as the familiar Wheatstone bridge; and it will thus be apparent that after a condition of balance is obtained, any change in resistance of resistors 21 and 22 will cause a deflection of meter 26. The remaining terminals of meter 26 are connected by conductors 28 and 29 to the transformer 18 so that a reference voltage will be provided for phase response, necessary because of the use of A. C. voltage. The meter 26 is designed so that it may be deflected in either direction from a central balanced position; and if it is properly calibrated, it will be possible to read the degree of unbalance between resistors 21 and 22 in terms of velocity of ascent or descent in feet per minute.

To change the relative resistance of resistors 21 and 22, flowmeter 13 is designed so that a jet of air will impinge upon resistor 22 when the aircraft is ascending, and a jet of air will impinge upon resistor 21 when the aircraft is descending. Since resistors 21 and 22 are connected to the source of power 18, a current will flow through these resistors and they will be heated thereby. The jet of air which impinges upon the corresponding resistor will cool the latter and this change in temperature will be accompanied by a change in resistance. If the circuit 15 is balanced after the resistors have reached a constant operating temperature, a cooling of either resistor will change its resistance relative to the other resistor and thus destroy the balance of the circuit.

It will thus be seen that any air which flows through the flowmeter 13 will cool either resistor 21 or resistor 22 and hence produce a deflection of the meter 26. The means whereby a flow of air in one direction cools only one of the two resistors 21 and 22 is described hereinafter, but it will be seen that the direction of the flow of air will cause the meter 26 to be deflected in a direction corresponding to which resistor is cooled. To produce the flow of air through the flowmeter 13, the reservoir 10 is connected through flowmeter 13 and by-pass 14 to the source of static pressure as previously described; and as the plane ascends, the static pressure decreases and the air within the reservoir, which is at a higher pressure, flows through flowmeter 13 to the Pitot-static tube where it is discharged. Since, as is well known, the pressure of the air decreases as the altitude is increased, and since any decrease in the static pressure will cause a flow of air from the reservoir 10, it will be seen that as the plane ascends, the air within the reservoir will flow through the flowmeter at a rate determined by the difference in pressure between the static pressure and the interior of the reservoir 10.

However, because of the change in density of the air as the altitude is changed, a unit change of pressure will correspond to a smaller change in altitude at sea level than at a higher altitude. For example, a change of pressure of 1 millimeter of mercury corresponds to a change of 36 feet at sea level; the same pressure change corresponds to a change in altitude of 49 feet at an altitude of 10,000 feet; at 20,000 feet altitude, the change corresponds to a 68 foot change in altitude; at 30,000 feet, a change in pressure of 1 millimeter corresponds to a change in altitude of 97 feet, while at 40,000 feet, this same change corresponds to 155 feet. This is illustrated graphically in Figure 3. Assuming that the rate of flow of air remains a constant for a given pressure differential, if an instrument were correctly calibrated so as to indicate a rate of change of 100 feet per minute at sea level, the same meter with the same rate of change would indicate only approximately 50 feet per minute change of altitude at 20,000 feet. This condition is obviously unsatisfactory and hence compensating means must be provided to take care of this variation of response with changing altitude.

In addition to the change of response caused by the variation of pressure differential at different altitudes mentioned just above, another factor enters which is characteristic of hot wire flowmeters. Since such flowmeters measure the cooling effect of the air blowing across a resistor, if the air is maintained at a constant temperature, it will be found that the cooling effect is proportional to the product of the velocity and the density of the air. Hence, since the density of the air decreases as the altitude is increased, further correction must be made. To provide these necessary corrections, I prefer to use the means illustrated in Figure 1.

As shown in Figure 1, my preferred compensating means includes the by-pass 14 around the flowmeter 13, so that air flowing from the reservoir 10 to the source of static pressure will generally divide into two streams. The first stream goes through the flowmeter 13, and the second stream passes through the by-pass 14, later rejoining the first stream intubing 34, after the first stream has completed its passage through the flowmeter. To control the amount of air flowing through the by-pass 14, I provide a valve 30 which may conveniently be operated directly by an aneroid 31. The valve used may be of any suitable type, but preferably is one which may be given any desired degree of opening for a given displacement. If the aneroid 31 is made of a metallic bellows which has been evacuated and which has a spring in it, the bellows will expand as the pressure surrounding it decreases. It is to be understood that the outside of the bellows is subjected to the outside air pressure as measured by the Pitot-static tube as, for example, by enclosing the aneroid in a housing 32, the interior of which is connected by tubing 33 to the source of static pressure through tubing 34. The valve 30 may be a calibrated needle valve arranged so that when the bellows 31 is in its most expanded position corresponding to the highest altitude for which the flowmeter is compensated, the valve 30 will be completely closed and all air entering or leaving the reservoir 10 must pass through the flowmeter 13. Obviously, any desired linear or non-linear characteristics can be given such a valve by modifying the needle, the seat, or both. As the altitude is decreased, the pressure within the chamber 32 acting upon the exterior of the aneroid 31 will be increased and valve 30 will be progressively opened so that an increasing percentage of the air flowing through tube 12 may by-pass the flowmeter 13 and go through valve 30. The valve 30 is calibrated so that the effects of changing density and changing pressure differential will be compensated for, and the meter 26 will thus give a true indication of the rate of ascent or descent.

It will now be apparent that one of the factors determining the sensitivity of the flowmeter 13 will be the size of the reservoir 10, for a reservoir with a small capacity will produce a limited flow of air through the flowmeter 13 for a given pressure differential. Conversely, if the size of the reservoir is quite large, there will be considerable flow through the flowmeter 13 for a very small pressure differential, and it is possible to use a reservoir of such size that the resultant sensitivity is too large and the meter 26 will fluctuate with the slightest change in pressure. Such sensitivity is neither needed nor desired in aircraft installation and hence I prefer to make my reservoir of a more moderate size. A further disadvantage of using too large a reservoir is found in that with a large reservoir, an appreciable time must elapse for the pressure within the reservoir to be equalized with the static pressure, and this causes a lag in the indication of the instrument. Any delayed response or lag of indication in an aircraft instrument is undesirable, and this is further reason for making the size of the reservoir 10 as small as practicable. Other factors which influence the sensitivity of the system are the voltage applied to the bridge network 15 and the sensitivity of the meter 26. Even though the instrument panels of the modern larger aircraft are insulated against vibration and shock, there is always a certain amount of vibration present and it is thus desirable to use a ruggedly constructed instrument. In general, the more ruggedly constructed instruments are less sensitive, and for this reason, the meter 26 will usually not be extremely sensitive. It is thus desirable to proportion the response of the various elements of the system so that the reservoir 10 may be made conveniently small, the meter 26 comparatively rugged, and the voltage applied to the bridge system adjusted so that the desired sensitivity will result.

For the same reasons that it is desirable to maintain the reservoir 10 as small as practical, it is also desirable to maintain the volume of the container 32 and of the tubing 12 and 33 as small as possible. In addition, the space on the rear side of the instrument panel of a modern airplane is very crowded and it is also quite difficult to work on the instruments mounted thereon. Consequently, one of the advantages of my device is that it may be mounted very near the Pitot-static head where the length of tubings 12 and 34 will be reduced to a minimum. Conductors 23, 24, and 25 may then be routed as needed, with conductors 25 and 27 going to the meter 26 on the instrument panel. In this way lengthy runs of small diameter tubing will be eliminated, and servicing and maintenance problems will be greatly simplified.

To secure the greatest accuracy from my improved flowmeter, it is desirable that any change in pressure be transmitted as quickly as possible to the reservoir 10 so that the lag of the system will be reduced to a minimum. In order to do this, it is necessary that frictional and turbulent losses in the passage of the air through the flowmeter 13 be reduced to a minimum. While flowmeters have previously been designed which make use of this hot wire resistance principle and provide the desired differential effect, they have generally had a rather elaborate and labyrinthian passage for the air which caused excessively large losses due to friction and turbulence of the air. In order to overcome these difficulties I have provided the flowmeter 13 shown in detail in Figure 2. As illustrated there, I provide a housing 40 having a partition 41 therein which divides the housing into two compartments 42 and 43. Suitable connecting means 44 and 45 permit the tubings 12 and 34 to be connected to the compartments 42 and 43 so that compartment 42 is fluid connected to reservoir 10 and compartment 43 is fluid connected to the source of static pressure. An orifice 46 in the partition 41 provides a passageway for air between compartments 42 and 43, and as is well known, such an orifice produces a jet extending downstream from the orifice when fluid is passed therethrough. Upstream from the orifice 46 there is no region of increased rate of flow except immediately adjacent the orifice, and this latter zone is quite small in comparison to the size of the jet on the downstream side of the orifice.

Immediately adjacent the orifice 46 and located so as to be within the jet therefrom, I mount a resistor 50 which may be of any suitable form and material, but which from the nature of the problem, must be relatively small. By way of example only, I have found that the filaments of small incandescent light bulbs, such as those having a miniature candelabra base and a glass envelope of approximately the same size, make excellent resistors when the glass envelope has been removed. Such resistors are relatively sturdy and are manufactured to relatively close tolerances both electrically and mechanically. In addition, the base of the bulb makes a very convenient mounting arrangement for the resistor since it provides the necessary mechanical rigidity and strength while permitting easy interchangeability should a resistor be broken for any reason whatsover. Consequently, in Figure 2 I have shown a socket 51, adapted to receive the base of such a light bulb, and mounted on a spider 52 so that the resistor 50 is rigidly held and properly supported with respect to the orifice 46. Since the outer shell of such sockets usually forms one connection to such light bulbs, I have found it convenient to make the spider 52 of metal so that the housing 40 may become one of the connections to the resistor 50. It will be apparent, though, that if for any reason it is desired that the housing 40 be completely insulated from the resistors, the spider 52 may be made of insulating material and separate connections run from the socket 51. The other connection from the socket 51 may be carried to any suitable connector 53 properly insulated from the housing 40.

Similarly, in compartment 42 a resistor 60 is mounted in a socket 61 which is supported by a spider 62, while one end of the resistor 60 may be connected to connector 63 which is likewise suitably insulated from housing 40. It will thus be seen that one connection from each of resistors 50 and 60 is grounded to the housing 40 and a suitable connection 64 may be provided to make connection thereto. If, of course, it is desirable to have the housing 40 electrically isolated from the system, the connector 64 may be insulated from the housing and separate leads from each of the resistors 50 and 60 run thereto.

It has been found that the size of the orifice 46 and the distance which the resistors 50 and 60 are mounted therefrom is not particularly critical so long as the resistors are mounted substantially equidistant from the corresponding faces of the partition 41. The bulbs from which the resistors 50 and 60 are secured are held to very close tolerances as to the distance of the resistor from the base of the bulb, and if the spiders 52 and 62 are mounted so that the sockets 51 and 61, respectively, are equidistant from the partition 41, the amount of unbalance in the bridge circuit 15, caused by replacing resistors, will be practically negligible for all normal measurements. It will be apparent, of course, that the resistors 50 and 60 should not be located so close to the partition 41 that there is any danger of their touching it, or of the insulation of the air breaking down at high altitude so that an arc is established between the resistor and the partition. Similarly, the resistors should not be mounted so that they extend into the zone of relatively high velocity air on the upstream side of the orifice 46, but this last requirement will generally be taken care of when the previously mentioned requirements are satisfied.

It will thus be seen that I have provided a flowmeter having directional characteristics which has a straight line flow therethrough, and only a single orifice, thereby creating a minimum of turbulence and reducing frictional losses by an appreciable degree. In addition, because of the simplicity of design, this flowmeter may be manufactured at a much lower cost than those previously proposed which required a considerable amount of special and delicate machine and tool work.

It will be seen that by using a flowmeter which measures the flow of air from a reservoir, increased sensitivity with greater mechanical ruggedness may be provided than if a diaphragm type of meter were used. With my device, by increasing the size of the reservoir, the sensitivity may be greatly increased without impairing the ruggedness of construction; while with the diaphragm type of instrument, wherein a pressure differential causes a diaphragm to move and this movement is indicated by a needle mechanically connected thereto, an increase in sensitivity requires either a change in the mechanical advantage of the connecting mechanism or requires a change in the size of the diaphragm which likewise leads to many complications from the construction and maintenance standpoint.

It will thus be seen that I have provided an improved flowmeter which is compensated for the condition of the fluid which it is measuring, and while I have shown and described a preferred form of my invention, I do not wish to be limited to the particular form or arrangement of parts herein described and shown except as specifically indicated by my claims.

I claim as my invention:

1. In a device of the class described, in combination, hot wire flow responsive means, said means comprising an enclosure divided into two compartments by an apertured partition and including a resistor in each compartment aligned with said aperture and spaced therefrom, first conduit means for connecting one of said compartments with a source of static pressure, an enclosed reservoir, additional conduit means connecting said reservoir to the other of said compartments, by-pass means connecting said first conduit means and said additional conduit means, said by-pass means including valve means for controlling flow through said by-pass means, pressure responsive means for operating said valve means, means enclosing said pressure responsive means, and means for placing said enclosing means in fluid flow relation to the first conduit means.

2. In a rate-of-climb indicating device for an aircraft, in combination, an enclosed reservoir, a hot wire flow sensing means, conduit means connecting said reservoir and sensing means in series with a source of static pressure, additional conduit means connected to said first named conduit means in by-pass relation with said flow sensing means, valve means for controlling flow through said additional conduit means, and means responsive to the pressure of said static pressure source for operating said valve means in a manner to compensate said flow sensing means in accordance with variations in said pressure.

3. An instrument of the class described which includes: a chamber through which fluid may flow; a first resistor mounted within said chamber; a second resistor mounted within said chamber and close to but not touching said first resistor; a partition member having an orifice therein interposed between said first and said second resistors with said orifice in alignment with said resistors whereby when fluid flows through said chamber, said orifice concentrates said flow of fluid on the resistor which is downstream of said orifice and provides substantially no concentration of said flow of fluid on the resistor which is upstream of said orifice; conduit means connected to said chamber in by-pass relation to said orifice; valve means for controlling flow through said conduit means; and pressure responsive means connected to said conduit means for actuating said valve means.

4. In a device of the class described, an enclosed fluid reservoir, conduit means for connecting said reservoir to a source of static pressure, said conduit means including a hot wire flow responsive means, additional conduit means connected to said first named conduit means and by-passing said flow responsive means, valve means for controlling flow through said additional conduit means, and pressure responsive means for actuating said valve means, said pressure responsive means being connected and arranged for responding to said static pressure.

GEORGE L. BORELL.

REFERENCES CITED

The following references are of record in the file of this patent:

UNITED STATES PATENTS

| Number | Name | Date |
|---|---|---|
| 1,308,557 | Shaw | July 1, 1919 |
| 2,015,839 | Brown | Oct. 1, 1935 |
| 2,147,962 | Bevins | Feb. 21, 1939 |
| 2,214,181 | Rylsky | Sept. 10, 1940 |
| 2,271,142 | Lippincott et al. | Jan. 27, 1942 |
| 2,283,311 | Bevins | May 19, 1942 |
| 2,295,728 | Gess | Sept. 15, 1942 |
| 2,379,293 | Goddard | June 26, 1945 |